United States Patent [19]

Rion

[11] 4,017,446
[45] Apr. 12, 1977

[54] FRICTIONALLY STABLE EMULSIONS

[75] Inventor: Pat F. Rion, Borger, Tex.

[73] Assignee: Phillips Petroleum Company, Bartlesville, Okla.

[22] Filed: Feb. 10, 1975

[21] Appl. No.: 548,581

Related U.S. Application Data

[63] Continuation-in-part of Ser. No. 276,372, July 31, 1972, abandoned, which is a continuation-in-part of Ser. No. 113,617, Feb. 8, 1971, abandoned.

[52] U.S. Cl. .............. 260/29.7 GP; 260/29.7 EM; 260/29.7 E
[51] Int. Cl.$^2$ .......................................... C08L 9/00
[58] Field of Search ............. 260/29.7 E, 29.7 EM, 260/29.7 GP; 106/281; 208/338

[56] References Cited

UNITED STATES PATENTS

| | | | |
|---|---|---|---|
| 2,826,619 | 3/1958 | Powers et al. | 208/338 |
| 3,055,853 | 9/1962 | Pickell | 260/29.7 EM |
| 3,404,108 | 10/1968 | Regenstein et al. | 260/29.7 E X |
| 3,434,994 | 3/1969 | Smit et al. | 260/29.7 |
| 3,577,250 | 5/1971 | Rostler | 106/278 |
| 3,763,074 | 10/1973 | Rostler | 260/29.7 GP |
| 3,769,246 | 10/1973 | Rostler | 260/5 |
| 3,805,447 | 4/1974 | Rion | 47/9 |

OTHER PUBLICATIONS

Weinstock et al., *Physical Props. of Oil Enriched Rubbers* in Ind. Eng. Chem., 45, No. 5, May 1953, pp. 1035–1043.

Morton, *Intro. To Rubber Tech.* pp. 169–170 (Reinhold, 1959).

*Primary Examiner*—J. Ziegler

[57] ABSTRACT

Incorporation of an elastomer into asphalt is achieved by treating the asphalt pavement with an emulsion having an external water phase and an oil phase containing a dissolved elastomer, the oil preferably being an aromatic oil having an aromatic content of at least 50 percent and a viscosity below 50 SUS at 210° F (99° C), the oil being mutually compatible with the asphalt and the elastomer.

16 Claims, No Drawings

FRICTIONALLY STABLE EMULSIONS

This application is a continuation-in-part of application Ser. No. 276,372, filed July 31, 1972, now abandoned, which is a continuation-in-part of application Ser. No. 113,617, filed Feb. 8, 1971, now abandoned.

The general concept of adding rubber to asphalt for the purpose of producing an improved binder for use in highway construction is well known, and the art demonstrates the many approaches made toward achieving this addition. In general, nearly all of the prior art pertaining to the incorporation of rubber into asphalt requires adding the rubber to hot asphalt prior to its use in road construction. The addition of the rubber to the asphalt takes place either at the refinery or at the hot plant where heat-liquefied asphalt is mixed with aggregate. Neither procedure is satisfactory. When rubber is added at the refinery, both the added rubber and the asphalt are degraded by the prolonged heating and excessive temperatures required to maintain the asphalt for an extended period of time in a liquid state prior to its use. When the rubber is added at the hot plant, it is not fully dissolved in the asphalt and not only is the added rubber ineffectively utilized but the undissolved rubber actually is harmful.

The degradation of the rubber dispersed in asphalt by heat is a time-temperature phenomenon. Degradation of the rubber increases with the time the rubber and the asphalt are maintained at the elevated temperature sufficient to liquefy the asphalt. Degradation of the rubber also increases as the temperature of the asphalt-and-rubber mixture becomes more elevated.

Further, the addition of rubber to the asphalt before construction of the pavement completely changes the characteristics of the asphalt and brings the asphalt outside specifications. This is highly objectionable from the standpoint of highway engineers faced with the problem of building highways using existing specifications and construction practices. Such specifications and construction practices have systematically evolved from meticulous observation of the correlation of road performance with specifications. To employ a modified asphalt which does not meet existing specifications would require discarding the existing knowledge in the field in an attempt to derive new specifications and construction procedures to suit the new material.

More recently, it has been proposed to incorporate elastomer into asphalt by use of an emulsion system comprising a water phase and an elastomer-containing oil phase, which is applied directly to the asphalt pavement. However, a problem with this approach to the incorporation of elastomers into asphalt is that poor firctional stability of the emulsion system causes premature breaking of the emulsion prior to its contact with the asphalt pavement.

By frictional stability is meant the ability of the emulsion to resist breakdown during passage through pipes, pumps, etc., during transfer from one vessel to another, during application to the asphalt surface, etc. Only a very stable emulsion is capable of surviving the extreme shear stresses imposed upon it by a gear pump without at least partial breakdown.

Another problem with the emulsion system approach to the incorporation of elastomers into asphalt has to do with the amount of oil applied to the asphalt surface. The oil softens the asphalt resulting in a loss in wet-skid resistance. It is desirable, therefore, to utilize an emulsion system having a lowered amount of oil, i.e., an emulsion system having a high elastomer to oil ratio. In the past, emulsion systems for treating asphalt have generally contained oil and elastomer wherein the elastomer:oil ratio ranged up to about 50:100 parts by weight.

It is thus an object of this invention to provide a stable emulsion system for treating asphalt pavement. Another object of the invention is to provide an improved method for rubberizing asphalt pavement. Another object of the invention is to provide a stable emulsion concentrate system for treating asphalt pavement. A further object of this invention is to provide a stable emulsion concentrate system for treating asphalt pavement wherein the elastomer:oil ratio is greater than about 50:100 parts by weight. Other aspects, objects, and the several advantages of the invention will be apparent to those skilled in the art from the following disclosure.

In accordance with one embodiment of the invention, it has been discovered that formulation of an emulsion system having a water phase and an oil phase containing dissolved elastomer, when utilizing an aromatic oil having an aromatic content above 50 percent and a viscosity below 50 SUS at 210° F (99° C), produces a frictionally stable emulsion system which can be readily applied to asphalt pavement.

In another embodiment of the invention, a process is provided which consists of incorporating rubber into an asphalt structure as a finishing operation after substantially all of the basic steps of pavement construction have been completed. By this process, the addition of rubber at the refinery or in the hot plant is not required, and no change in existing asphalt specifications is necessary. Moreover, the inventive method of application ensures that the total quantity of rubber employed is an effective rubber in forming a bond between the aggregate particles wherein the rubberized asphalt contains a small amount of rubber, thus reducing the cost of the rubber additive.

In a further embodiment of this invention, there is provided an emulsion system having an elastomer:oil ratio in the range of up to about 1:1 parts by weight or even higher.

The treatment of an asphalt pavement with the emulsion of this invention not only achieves improved rubbery properties of the pavement but also reduces the air voids of the asphalt concrete and increases its durability.

In accordance with the overall concept of this invention, a solution of an elastomer is formed in a suitable aromatic oil. The resulting solution is then emulsified in water and thereafter applied in a proper dilution at a desired rate to the asphalt pavement. The preferred emulsification system is one resulting in a cationic emulsion. The aromatic oil in the preferred embodiment is substantially free of asphaltenes, i.e., has a maximum asphaltenes content of not more than about one percent, and has a viscosity below 50 SUS at 210° F (99° C). Preferably, the oil should be soluble in n-pentane, according to the method described in ASTM designation D2006-65T. The elastomer should be soluble in the oil, and the oil should be compatible with the asphalt and the elastomer.

In one presently preferred embodiment of the invention, an $SO_2$ extract oil is employed as the aromatic oil, having the following properties:

| | |
|---|---|
| Specific gravity | 0.991 |
| API gravity | 10–11 |
| Flash point | 230° F (110° C) |
| Pour point | 40° F (4.5° C) |
| Viscosity, Saybolt Universal Seconds at 210° F (99° C) | 40 |
| Paraffinic hydrocarbons | 0 |
| Carbon residue | 1.75% |
| Sulfur, weight percent | 1.4 to 2 |
| Bromine number | 28.5 |
| Olefins, volume percent | 48 |
| Aromatics, weight percent | 74 |
| Initial boiling point on distillation | 500° F (260° C) |
| 50% boiling point on dist. | 670° F (354.5° C) |
| 80% boiling point on dist. | 744° F (395.5° C) |

Such an oil is produced by liquid-liquid extraction of a cycle oil recovered from the products of a catalytic cracking process. Sulfur dioxide is used as the selective solvent in the extractor, the sulfur dioxide selectively dissolving the aromatics from the feed oil and rejecting the nonaromatic portion. The aromatic product is recovered from the sulfur dioxide extract by distillation. The aromatic oil may be used directly as the oil phase in the preparation of the inventive emulsion or it may be additionally vacuum fractionated for removal of light and/or heavy ends. A preferred oil with the properties given in the above table was vacuum distilled at 5 mm Hg pressure and 70 percent of the feed taken overhead as the product oil. The oil may be additionally purified by a lime-treating step for removal of traces of sulfur dioxide. For further details of the sulfur dioxide extraction process for the preparation of an aromatic oil suitable for the emulsions of this invention, see U.S. Pat. No. 3,007,979 to Peters.

Similar oils with high aromatic contents may be prepared by solvent extraction of cycle oils using other selective solvents, for example, phenol, sulfolane, diethylene glycol, etc. If desired, mixtures of these oils or mixtures thereof with other oils can be employed so long as the ultimate blend possesses the required aromatic and SUS values as above defined.

In another preferred embodiment of this invention there is provided an oil-water emulsion concentrate having an oil phase and a water phase and wherein said water phase constitutes from about 25 to 60 weight percent of the total emulsion and said oil phase constitutes from about 75 to 40 weight percent of said emulsion, wherein said oil phase contains from 2 to about 60 weight percent elastomer dissolved therein and wherein said oil phase is formed of an aromatic oil having an aromatic content of at least 50 percent and a viscosity below 50 SUS at 210° F (99° C).

Such emulsion concentrates are of particular importance since they permit the transporting of stable higher elastomer content emulsions at reduced freight rates. Such stable systems can be readily diluted on location to give the desired rubber content for the treatment of the asphalt pavement.

The term "elastomer" as used herein is intended to include any type of rubber, natural or synthetic, which is soluble in the aromatic oils above described. Such elastomers are, for example, natural rubber, butadiene-styrene copolymers formed by either emulsion or solution processes, such as SBR 1500 (ASTM D-1419-62T), SBR block copolymers, cis-polyisoprene and trans-polyisoprene. In one presently preferred embodiment of the invention, the elastomer is a solution-polymerized butadiene-styrene block copolymer having a number average molecular weight of about 50,000 to 150,000.

It has been discovered that emulsions and emulsion concentrate systems having an elastomer:oil ratio of up to about 1:1 can be prepared by employing as the elastomer, a butadiene-styrene radial block copolymer with terminal block segments of block polystyrene having a number average molecular weight in the approximate range of 50,000 to 60,000 and containing from 50 to 75 weight percent butadiene with the remainder being styrene.

In a more presently preferred embodiment, the elastomer is a solution-polymerized butadiene-styrene radial block copolymer containing about 60 weight percent butadiene and about 40 weight percent styrene having a number average molecular weight in the range of 50,000 to 60,000.

The emulsion systems of this invention are prepared by first forming a solution of the elastomer in the aromatic oil. The quantity of elastomer present in the oil can be varied depending on the amount of elastomer to be combined with the asphalt within the treated asphalt pavement. The resulting solution of elastomer in aromatic oil is then emulsified with water to form an emulsion concentrate as above described wherein the elastomer concentration is about 2 to about 60 percent by weight and the oil phase (oil plus elastomer) represents from about 40 to 75 weight percent of the total emulsion concentrate. The resulting concentrate can be applied to asphalt pavement or it can be further diluted with water prior to its application to the pavement.

The quantity of water employed in the dilution of the emulsion concentrate can be varied within the scope of this invention and depends upon the treatment to be given to a particular asphalt pavement. Generally, diluted emulsion systems which contain 90 to 50 percent by weight of water, from 10 to 50 percent by weight of the oil rubber phase and from 2 to 15 percent by weight elastomer are employed for the asphalt treatment.

Typical of emulsification equipment which may be used in forming the emulsion are colloid mills, high-speed emulsifiers, ultrasonic emulsifiers, homogenizers, pipeline mixers, and the like. Any emulsification equipment can be used which produces a fine-particle-size emulsion of high stability, i.e., an emulsion which will not break on contact with the road surface and which will penetrate into the pavement to the depth desired.

In the practice of this method, the water-oil emulsion is applied to asphalt-aggregate mixture after it has been laid down to form a surface. The emulsion can be applied by spraying the road, using conventional truck sprayers, immediately after the pavement has been laid, while it is still at elevated temperature somewhat above its softening point, and while it is cooling. Also, for example, the emulsion can be applied to asphalt pavement after it has been compacted by steel rollers, or even later in the road-building procedure, after the pavement has been compacted by pneumatic rollers. The permeability of the asphalt pavement will vary, of course, depending upon the type and grading of the aggregate and the degree of compaction. The porosity and void content of the asphalt pavement are variables which affect the rate at which the emulsion will penetrate the asphalt pavement and the amount of emulsion accepted by the pavement.

Similarly, the degree of dilution of the emulsion is a variable which will affect the rate of penetration of the emulsion into the asphalt. Thus, for example, if the asphalt pavement is relatively dense and has received a high degree of compaction, it may be desirable to use a more dilute emulsion, that is, one having a higher water content. The increased water content of the emulsion will assist in its penetration into the highly compacted asphalt-aggregate mix to give uniform distribution of the elastomer throughout. Conversely, in treating an asphalt having a relatively low degree of compaction, it may be desirable to use a more concentrated emulsion to ensure that the emulsion will not penetrate too rapidly into the asphalt resulting in non-deposition of the elastomer.

In general, it is desirable that the emulsion be a stable emulsion, i.e., will not break until it has penetrated the asphalt concrete to the depth desired. The time required for penetration will depend, of course, on the grading of the aggregate and the degree of compaction of the asphalt pavement, as well as on the degree of dilution of the emulsion. Concerning the depth of penetration desired, a relatively concentrated emulsion will deposit the elastomer solution in the upper surface of the asphalt pavement. A more dilute solution will distribute the elastomer more uniformly through the pavement or may concentrate the elastomer in the lower portion thereof. To accomplish the latter result, a fairly dilute emulsion will penetrate more easily into the pavement and will not plate out the elastomer solution therein until after it has penetrated a considerable depth into the asphalt. The rate of plating out will also depend on the emulsification system used; i.e., a cationic emulsion will plate out more readily than an anionic emulsion.

All of the above variables of degree of compaction of the asphalt, degree of dilution of the emulsion, nature of the emulsion, and desired elastomer concentration within the asphalt, are interrelated in the performance of this process. Thus, while a stable cationic emulsion is preferred in the practice of the inventive process, a relatively fast-breaking emulsion or anionic emulsion can be employed under conditions whereby the emulsion penetrates relatively rapidly and does not break at the surface.

The concentration of the emulsion should be such that the emulsion penetrates into the pavement before the water evaporates to leave an oil film on the road surface. Further, the emulsion should not be so dilute that it runs through the pavement to the base course.

One objective is to use the emulsion at a concentration of the oil in the water so that the oil and the rubber content plate out on the asphalt uniformly throughout the depth of the asphalt-aggregate phase. The trial on a section of the pavement to be treated by spraying the oil onto the pavement surface to cover the section will show whether the emulsion is so concentrated as to produce an oil film on the pavement surface. Further, a sample core of the asphalt pavement and a suitable extraction of the asphalt will indicate the distribution of the rubber component in the asphalt. Such techniques are common in the art of road-building and are well understood by those skilled in the art.

The amount of rubber which is added to the asphalt in the practice of this invention can be varied depending upon the properties desired in the finished pavement.

The oil emulsion is spread in gallons per square yard (liters per square meter) of pavement to provide an elastomer concentration, relative to the asphalt contained in the pavement, of preferably between about 0.1 to about 2.5 weight percent of the asphalt. If desired, however, higher amounts of elastomer, such as 5 or even 10 percent by weight of the asphalt, can be added, depending upon the properties desired in the asphalt pavement and the solubility characteristics of the particular polymer in the particular oil employed.

The concentration of the elastomer in the final emulsion will depend on the amount of polymer to be added to the asphalt and on the concentration of the oil phase in the emulsion applied to the road. A concentration ranging from about 2 to about 15 percent of elastomer in the final emulsion is most satisfactory, with the amount of oil added to the asphalt being maintained at a level below that at which it will dissolve or strip the asphalt from the aggregate and redeposit the asphalt from one place in the pavement to another. In general, however, the oil added to the pavement in the emulsion should not exceed about one-third of the weight of the asphalt in the pavement.

The rate of application of the oil emulsion, in gallons per square yard per inch of depth of the pavement (liters per square meter per centimeter of depth), depends on the weight of pavement per inch (cm.) of depth and on the asphalt content of the pavement. The rate of application and the degree of rubberizing can be varied to accommodate any construction specification.

In carrying out the process of the invention, the oil-rubber solution is applied to the pavement as an emulsion in which the water is the outer phase and the rubber solution is the inner phase. This constitutes a preparation containing two media for depositing the rubber in the asphalt binder. The aromatic oil used to dissolve the rubber serves as a carrier for the rubber to be combined with the asphalt in the pavement and as a mutual solvent for both the asphalt and the rubber. The water in the emulsion serves as a carrier for the solution to be deposited on the asphalt in the pavement.

The following examples illustrate the formation of stable emulsions for treating an asphalt-aggregate combination in accordance with the present invention.

EXAMPLE I

Emulsion Preparation

A series of emulsion systems were prepared as follows:

(1) Oil phase preparation:

An aromatic oil in the amount of 119 gallons (450 l) was metered into a 150-gallon (568 l) tank together with about 160 pounds of a butadiene-styrene rubber having a number average molecular weight of about 122,000. Small quantities of Oronite NT-W, a water-soluble nonionic surfactant of the alkylphenolethylene oxide condensate type (obtainable from Oronite Chemical Company), Cyanox SS (2,2'-methylenebis(4-methyl-6-t-butyl phenol)), and Automate Blue (1,4-dialkylaminoanthraquinone) used as a dye, were also added. The mixture was heated to 300° F and stirred until all components were fully dissolved.

(2) Water phase preparation:

Water in the amount of 76.5 gallons (290 l) was metered into a 375-gallon (1420 l) tank together with a small amount of Redicote E-I, a cationic emulsifier obtainable from Armour & Company. Contents of the tank were stirred and heated to about 170° F (76.7° C). Small amounts of Saponin, a surfactant available from S. B. Penick and Co., and 31.5% hydrogen chloride were then added to the water-phase tank.

(3) Emulsion formation:

The emulsions were formed by pumping the water phase through a Gifford-Wood homogenizing pump at 50 gallons (189 l) per minute and back into the water tank. The oil phase was then admixed with the water phase at the inlet to the homogenizer at 3 gallons (11.3 l) per minute. This was continued until all the oil phase had been added to the water phase. The emulsions thus prepared had the following composition:

| Component | Weight % |
|---|---|
| Rubber | 9.0 |
| Aromatic oil | 51.0 |
| Oronite NI-W | 2.5 |
| Automate Blue | 0.025 |
| 31.5% HCl | 0.3 |
| Redicote E-I | 0.5 |
| Saponin | 0.06 |
| Water | 36.525 |
| Cyanox SS | 0.09 |
| | 100.000 |

EXAMPLE II

Frictional Stability and Asphalt Penetration Tests

Each of the emulsion systems of Example I was evaluated for frictional stability in the following manner.

The freshly prepared emulsion was tested for asphalt penetration. Another sample of each emulsion was passed through a gear pump (simulating commercial application to an asphalt surface) operated at 1725 rpm and then was tested for asphalt penetration, thus determining the extent of emulsion breakdown during the gear-pump treatment. The results are as follows:

I. The emulsions thus prepared had the following compositions:

| Emulsion Component | A Weight % | B Weight % |
|---|---|---|
| Oil Phase | | |
| Rubber | 12.0 | 18 |
| Oil | 48.0[1] | 42.0[2] |
| Cyanox | 0.09 | 0.09 |
| Oronite NI-W | 2.5 | 2.5 |
| Automate Blue | 0.025 | 0.025 |
| Water Phase | | |
| 31.5% HCl | 0.3 | 0.3 |
| Redicote E-I | 0.5 | 0.5 |
| Saponin | 0.06 | 0.06 |
| Water | 34.525 | 34.525 |

[1] 10 Kansas City extract oil Viscosity 45 SUS at 210° F (99° C) Aromatic content - 73 wt. %
[2] Distilled $SO_2$ extract oil Viscosity 40 SUS at 210° F (99° C) Aromatic content - 74 wt. %

Each of the emulsion systems (A, B) was diluted to 6 percent rubber and evaluated for frictional stability and asphalt penetration in the manner as described in Example II, supra.

The following results were obtained:

| | A Minutes Seconds | B Minutes Seconds |
|---|---|---|
| Asphalt Penetration Emulsion on fresh, Valley Asphalt | 41 | 51 |
| Emulsion After 40° F (4.5 c) Pump, Valley Asphalt | 1 to 65 | 55 |

It can be seen that the emulsions made with oils have viscosities above 50 SUS at 210° F (99° C) either broke down completely in the gear pump, causing it to lock, or partially broke down, requiring excessively long

| Emulsion No. | Aromatic Oil Used | Oil Properties Aromatic Content, Wt.% | Viscosity, SUS at 210° F | Asphalt Penetration Data[a] Fresh Emulsion | After Gear Pump Test At 40° F and 1725 rpm | |
|---|---|---|---|---|---|---|
| 1 | 50/50 Philrich 5[b] $SO_2$ Extract | >70 | >50, est. 100 | 66 seconds | Locked gear pump | |
| 2 | 50/50 Wide cut lube oil Califlux GP[c] | >70 | >50, est. 90 | 35 seconds | Locked pump | |
| 3 | 50/50 $SO_2$ Extract oil | >70 | >50, est. 75 | 67 seconds | >10' (minutes) | |
| | | | | | Minutes | Seconds |
| 4 | Distilled $SO_2$ Extract oil (70% distilled overhead) | 74 | 40 | 38 seconds | 2' | 0" |
| 5 | " | " | " | 46 seconds | 1' | 23" |
| 6 | " | " | " | 53 seconds | | 58" |
| 7 | " | " | " | 60 seconds | 1' | 20" |
| 8 | " | " | " | 33 seconds | 1' | 6" |
| 9 | Lime-treated distilled $SO_2$ extract oil | " | " | 54 seconds | 1' | 45" |
| 10 | " | " | " | 45 seconds | 1' | 16" |
| 11 | " | " | " | 44 seconds | | 41" |
| 12 | " | " | " | 48 seconds | 1' | 31" |
| 13 | " | " | " | 57 seconds | | 59" |

[a] Penetration measured by building an asphalt briquette with a ¾-inch lip around the outer surface, pouring enough emulsion onto the top of the briquette to just fill the "lake" thus formed, and measuring the time it takes for the emulsion to soak into the briquette, i.e., disappear. For a more detailed description, see "Emulsified Petroleum Oils and Resins in Reconstituting Asphalts in Pavements" by B. A.Vallerga, published by the California Highway Dept. in 1963 as Highway Research Record No. 24 (pp. 100–101).
[b] Viscosity 200–250 SUS at 210° F (99° C)
[c] Oil product of Golden Bear Oil Company

EXAMPLE III

A further series of emulsion systems were prepared in accordance with the procedure as set forth in Example asphalt penetration times (see test 3). Only the aromatic oils with viscosities below 50 SUS at 210° F (99° C) gave acceptable asphalt penetration times after passage through the gear pump.

EXAMPLE IV

An emulsion system was prepared using a low molecular weight radial block copolymer prepared according to the following recipe:

| Polymerization Recipe | |
|---|---|
| | Parts by Weight |
| Butadiene | 60 |
| Styrene | 40 |
| Cyclohexane | 800 |
| n-BuLi | 0.43 |
| Coupling Agent, SiCl₄ | .397 |
| Stabilizers | 2.0 |

The cyclohexane was charged first, the reactor was purged with nitrogen, the styrene was added and then the butyllithium. The polymerization was continued until substantially all of the styrene had polymerized, as indicated by the drop in temperature following its initial rise. The butadiene was then added and polymerization was continued until substantially all the butadiene had polymerized. The silicon tetrachloride was then added and the stabilizer was added. The polymer was steam stripped, washed and dried.

The polymer had the following properties:

| Polymer Properties | |
|---|---|
| ML-4, 212° F (130° C) | 30 (ASTM D646) |
| Melt Index, 180° C, 5 Kg. | 178 (ASTM D1238-70) |
| Trans, % | 31.8 |
| Vinyl, % | 6.1 |
| Styrene, % | 39.2 |
| Polystyrene, % | 36.1 |
| Ash, % by wt. | 0.31 |
| Mw/Mn × 10⁻³ | 68/59 |
| I.V./Gel | 0.50/0 |

An emulsion concentrate was prepared using the rubber described above, in accordance with the procedure set forth in Example I. The emulsion thus prepared had the following composition:

| Emulsion Component | Weight % |
|---|---|
| Oil Phase | |
| Rubber | 30.0 |
| Oil[1] | 30.0 |
| Oronite NI-W | 2.5 |
| Automate Blue | 0.025 |
| Cyanox SS | 0.30 |
| Water Phase | |
| Water | 34.165 |
| 31.5% HCl | 0.45 |
| Redicote E-I | 0.5 |
| Methanol | 2.0 |
| Saponin | 0.06 |
| (pH) | (2-2.5) |

[1]Distilled SO₂ extract oil. Viscosity 40 SUS at 210° F (99° C). Aromatic Content - 74 wt. %.

| Makeup and Run Temperature | |
|---|---|
| Oil Phase | 300° F (149° C) |
| Water Phase | 120° F (49° C) |

The emuslion concentrate was diluted to 6 percent rubber by addition of 4 parts water and evaluated for asphalt penetration in the manner as described in Example II, supra, and for 24-hour stability.

The following results were obtained:

| | |
|---|---|
| 24-hour calcium chloride stability[1] | Good[3] |
| 24-hour sodium chloride stability[2] | Good[3] |
| Asphalt penetration, seconds | 31 |

[1]Emulsion diluted 1 part emulsion:4 parts a 10 percent by weight solution of CaCl₂ and allowed to stand 24 hours.
[2]Emulsion diluted 1 part emulsion:4 parts of a 5 percent by weight solution of NaCl and allowed to stand 24 hours.
[3]Rating "Good" indicates excellent stability.

Field tests of the emulsion system given above and emulsion concentrate B of Example III were conducted on a section of Swan Drive in Bartlesville, Oklahoma. Each of the emulsion concentrates was diluted to 6 percent rubber prior to the tests.

The Swan Drive field test consisted of 1360 lineal feet (413.4 m) of dense-graded mix overlay. The east side of the road utilized Valley asphalt cement (from a San Joaquin Valley, California crude) and the west side of the road utilized Kansas City asphalt (Mid-Continent crude). Both sides of the road had 1170 lineal feet (356m) (980 feet of 1-inch depth and 190 feet of 2-inch depth) (298 m of 2.54 cm depth and 57.8 m of 5.08 cm depth) of asphaltic concrete containing 5.25 percent asphaltic cement, and 190 lineal feet (1-inch depth) (57.8 m of 2.54 cm depth) containing 6.25 percent asphaltic cement.

The emulsions were applied at a rate of 0.112 gallon per square yard (0.507 l/sq. m). The wet-skid resistance values of the treated pavement were obtained according to ASTM E 445-71T.

In general, the higher rubber/oil (30/30) - containing emulsion exhibited less early wet-skid resistance loss than the lower rubber/oil (18/42) - containing emulsion.

In addition, as demonstrated by the foregoing specification and the examples, this invention provides a method of improving the properties of asphalt by treating an asphalt-aggregate mixture with an aromatic oil-in-water emulsion, as described previously, in which the aromatic oil phase contains a dissolved elastomer. Preferably, the emulsion is a cationic emulsion and can contain a cationic emulsifier in an amount preferably less than about 3 percent by weight based on the weight of the oil phase. Generally, the weight of the cationic emulsifier will range between about 0.5 to about 3.0 percent by weight of the oil phase.

A great number of suitable surfactants are available. The surfactant should preferably be a good emulsifying agent. Other surfactants and emulsifiers can also be added, as well as mixtures thereof, to facilitate emulsification and to minimize foaming, if desired.

Emulsifiers can be of the class of fatty quaternary ammonium salts, fatty amido-amino-amine salts, e.g., amido-amino-amine acetate, etc., and include the use of both cationic and nonionic surfactants such as poly(ethoxy) compounds. Various suitable surfactants are described in standard textbooks, such as "Encyclopedia of Surface Active Agents" by Sisley and Wood (Chemical Publishing Company, Inc., New York) and "Surface Active Agents and Detergents" by Schwarz, Perry and Berch (Interscience Publishers, New York).

In addition to emulsifying agents, stabilizers also can be employed to stabilize the emulsion against electrolytes which may be present in the water employed to make or dilute the emulsion.

By a cationic emulsion is meant one in which the oil phase will deposit on the negative electrode if the emulsion is subjected to electrophoresis. Nonionic surfactants, as described, may be present in an amount up to as high as about 2 percent by weight of the oil phase.

Reasonable variations and modifications can be made or followed in the foregoing specification without departing from the spirit and scope thereof.

I claim:

1. A frictionally stable oil-in-water emulsion having a water phase and an oil phase wherein said oil phase consists of an aromatic oil having an aromatic content of at least 50 percent and a viscosity below 50 SUS at 210° F and an elastomer dissolved therein.

2. An emulsion system according to claim 1 wherein said emulsion contains from about 2 to 15 weight percent of elastomer.

3. An emulsion system according to claim 1 wherein said elastomer is a styrene-butadiene block copolymer.

4. An emulsion system according to claim 1 wherein said oil phase is present in an amount in the range of 10 to 50 weight percent, said water phase is present in an amount in the range of 90 to 50 weight percent and said elastomer is present in an amount in the range of about 2 to 15 weight percent.

5. An emulsion system according to claim 3 wherein said styrene-butadiene block copolymer has a number average molecular weight in the range of 50,000 to 150,000.

6. An emulsion system according to claim 5 wherein said styrene-butadiene block copolymer is a radial block copolymer and has a number average molecular weight in the range of 50,000 to 60,000.

7. An emulsion system according to claim 1 wherein said oil is an $SO_2$ extract oil having an aromatic content of 74 weight percent and a viscosity of 40 SUS at 210° F.

8. An emulsion system according to claim 6 wherein said oil phase contains 6 weight percent elastomer dissolved therein and wherein said oil phase constitutes about 12 weight percent of said emulsion.

9. An emulsion system according to claim 1 wherein said emulsion contains an emulsifier.

10. An oil-water emulsion concentrate having an oil phase and a water phase wherein said water phase constitutes from about 25 to 60 weight percent of the total emulsion concentrate and said oil phase constitutes from about 75 to 40 weight percent of said total emulsion concentrate, wherein said oil phase contains from 2 to about 60 weight percent elastomer dissolved therein and wherein said oil phase is formed of an aromatic oil having an aromatic content of at least 50 percent and a viscosity below 50 SUS at 210° F.

11. A concentrate according to claim 10 wherein said elastomer is a butadiene-styrene block copolymer having a number average molecular weight in the range of 50,000 to 150,000.

12. A concentrate according to claim 11 wherein said oil is an $SO_2$ extract oil having an aromatic content of 74 percent and a viscosity of 40 SUS at 210° F.

13. A concentrate according to claim 12 wherein said elastomer is a butadiene-styrene radial block copolymer having a number average molecular weight in the range of 50,000–60,000.

14. A concentrate according to claim 13 wherein said oil phase contains 50 weight percent elastomer dissolved therein and wherein said oil phase constitutes about 60 weight percent of said concentrate.

15. A concentrate according to claim 12 wherein said oil phase contains 30 weight percent elastomer dissolved therein and wherein said oil phase constitutes about 60 weight percent of said concentrate.

16. A concentrate according to claim 11 wherein said oil phase contains 20 weight percent elastomer dissolved therein and wherein said oil phase constitutes about 60 weight percent of said concentrate.

* * * * *